(12) United States Patent
Mizumachi

(10) Patent No.: US 11,209,064 B2
(45) Date of Patent: Dec. 28, 2021

(54) BUFFER STOPPER

(71) Applicant: NOK CORPORATION, Tokyo (JP)

(72) Inventor: Shoji Mizumachi, Tottori (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 16/084,855

(22) PCT Filed: Feb. 28, 2017

(86) PCT No.: PCT/JP2017/007608
§ 371 (c)(1),
(2) Date: Sep. 13, 2018

(87) PCT Pub. No.: WO2017/159332
PCT Pub. Date: Sep. 21, 2017

(65) Prior Publication Data
US 2019/0085928 A1 Mar. 21, 2019

(30) Foreign Application Priority Data
Mar. 14, 2016 (JP) .............................. JP2016-049278

(51) Int. Cl.
*F16F 1/38* (2006.01)
*B62D 3/12* (2006.01)
(Continued)

(52) U.S. Cl.
CPC .............. *F16F 1/3828* (2013.01); *B62D 3/12* (2013.01); *F16F 1/3713* (2013.01);
(Continued)

(58) Field of Classification Search
CPC ...... F16F 1/3828; F16F 1/3713; F16F 1/3716; F16F 1/44; F16F 2230/0023; F16F 7/087; F16F 1/3735; F16F 1/3835; B62D 3/12
See application file for complete search history.

(56) References Cited

U.S. PATENT DOCUMENTS

| 2,214,743 A | 9/1940 | Saurer |
| 2,215,743 A * | 9/1940 | Saurer ...................... F16F 7/00 248/569 |

(Continued)

FOREIGN PATENT DOCUMENTS

| CN | 102052462 A | 5/2011 |
| CN | 103465789 A | 12/2013 |

(Continued)

OTHER PUBLICATIONS

International Search Report issued in International Bureau of WIPO Patent Application No. PCT/JP2017/007608, dated Apr. 11, 2017.

(Continued)

*Primary Examiner* — Robert A. Siconolfi
*Assistant Examiner* — James K Hsiao
(74) *Attorney, Agent, or Firm* — Greenblum & Bernstein, P.L.C.

(57) ABSTRACT

A buffer stopper capable of increasing an absorbable energy amount without causing changes in characteristics due to wear of a buffer body. In order to achieve the object, the buffer body containing a rubber elastic body disposed between an end surface formed in a housing and an end surface formed in a shaft which is relatively movable in the axial direction with respect to the housing and a wear resistant sheet which is provided so as to surround the outer peripheral surface of the buffer body and which can contact an inner peripheral surface of the housing by expansion and deformation in the radial direction of the buffer body are provided.

4 Claims, 4 Drawing Sheets

(51) Int. Cl.
*F16F 1/44* (2006.01)
*F16F 1/371* (2006.01)
*F16F 1/373* (2006.01)
*F16F 7/08* (2006.01)

(52) U.S. Cl.
CPC .......... *F16F 1/3716* (2013.01); *F16F 1/3735* (2013.01); *F16F 1/44* (2013.01); *F16F 7/087* (2013.01); *F16F 2224/025* (2013.01); *F16F 2230/0023* (2013.01); *F16F 2232/08* (2013.01)

(56) References Cited

U.S. PATENT DOCUMENTS

| | | | | |
|---|---|---|---|---|
| 2,635,766 | A * | 4/1953 | Willison | B61G 9/06 213/46 R |
| 2,763,379 | A * | 9/1956 | Danielson | B61G 9/14 213/45 |
| 2,854,149 | A * | 9/1958 | Withall | B61G 9/14 213/45 |
| 3,486,396 | A * | 12/1969 | Kiyoshi | B62D 1/192 74/492 |
| 6,427,965 | B1 * | 8/2002 | McCracken | F16F 1/44 248/346.01 |
| 8,925,939 | B2 * | 1/2015 | Ohashi | B62D 3/12 280/93.514 |
| 9,302,697 | B2 * | 4/2016 | Ohashi | B62D 7/163 |
| 9,302,698 | B2 * | 4/2016 | Enomoto | B62D 7/226 |
| 2006/0131828 | A1 | 6/2006 | Tanaka | |
| 2014/0339037 | A1 * | 11/2014 | Kawaguchi | C08K 3/04 188/380 |
| 2015/0158520 | A1 * | 6/2015 | Watanabe | F16F 7/095 280/93.514 |
| 2015/0307115 | A1 * | 10/2015 | Wang | B61G 9/06 213/47 |

FOREIGN PATENT DOCUMENTS

| | | |
|---|---|---|
| CN | 203666761 U | 6/2014 |
| CN | 104879497 A | 9/2015 |
| EP | 2027396 B1 | 2/2009 |
| JP | 8-133102 | 5/1996 |
| JP | 2005-47341 | 2/2005 |
| JP | 2008-024076 | 2/2008 |
| JP | 2009-012663 | 1/2009 |
| JP | 2014-100935 | 6/2014 |
| JP | 2015-186950 A | 10/2015 |
| WO | WO2007/143760 | 12/2007 |

OTHER PUBLICATIONS

Extended European Search Report in related European Application No. 17766335.8, dated Mar. 4, 2019.

Chinese Office Action in corresponding Chinese Application No. 201780007254.8, dated May 10, 2019.

* cited by examiner

BUFFER STOPPER

BACKGROUND OF THE INVENTION

Field of the Invention

The present invention relates to a buffer stopper attached as a buffer unit to an end portion of a steering rack in a steering gear of vehicles, for example.

Description of the Conventional Art

An apparatus in which a shaft and a housing may collide with each other in the axial direction as in a steering rack and a rack housing of a steering gear of vehicles, for example, is provided with a buffer stopper for the purpose of preventing noise and breakage caused by a shock.

FIG. 5 illustrates a buffer stopper according to a conventional technique in an attachment state. In FIG. 5, the reference numeral 200 denotes a housing and the reference numeral 300 denotes a shaft passed through the housing 200 so as to be reciprocatable in the axial direction. The buffer stopper 100 is disposed between an end surface 301a of an enlarged diameter portion 301 of the shaft 300 and an end surface 201a of a flange portion 201 of the housing 200 facing the end surface 301a in the axial direction and has a metal ring 101 caused to abut on the end surface 201a on the housing 200 side, a metal ring 102 caused to abut on the end surface 301a on the shaft 300 side, and a buffer body 103 integrally provided between the metal rings 101 and 102 and containing a rubber elastic body (rubber material or synthetic resin material having rubber-like elasticity).

More specifically, the buffer stopper 100 of this type reduces a shock by the compression and deformation in the axial direction of the buffer body 103 between the metal ring 101 caused to abut on the end surface 201a on the housing 200 side and the metal ring 102 caused to abut on the end surface 301a on the shaft 300 side in a process in which the shaft 300 reciprocating in the axial direction with respect to the housing 200 reaches the stroke end thereof (for example, refer to the following Patent Document).

PRIOR ART DOCUMENT

Patent Documents

Patent Document 1: Japanese Unexamined Patent Publication No. 8-133102

SUMMARY OF THE INVENTION

Problem to be Solved by the Invention

Herein, the buffering of the buffer stopper 100 is performed through the absorption of the kinetic energy by the mass and the movement speed of the shaft 300 by the reaction force and the displacement to the compression of the buffer body 103 containing a rubber elastic body. The magnitude of the absorbable energy amount can be expressed as the area of a hatched region between the characteristic line of the buffer body 103 and the horizontal axis as illustrated in FIG. 6 in which the reaction force is plotted on the vertical axis and the displacement amount is plotted on the horizontal axis. Therefore, in order to increase the absorbable energy amount, it is common to increase the area of the hatched region in FIG. 6 by increasing the maximum compression and displacement amount of the buffer body 103 or increasing the reaction force (spring constant).

However, in the buffer stopper 100 of this type, when permissible space is severely limited due to the structure of an apparatus to be buffered, such as a steering gear, the volume of the buffer body 103 cannot be simply increased as a method for increasing the absorbable energy amount, and therefore it is common to adopt a rubber elastic body having a high spring constant for the buffer body 103. However, there is a problem that the spring constant of the rubber elastic body is also limited, and therefore it is difficult to obtain sufficiently high reaction force in some cases, so that the absorbable energy amount cannot be sufficiently increased.

Moreover, there is also the buffer stopper 100 which is configured so that, when the buffer body 103 receives compression in the axial direction, the outer peripheral surface of the buffer body 103 contacts an inner peripheral surface 202a of a large-diameter cylindrical portion 202 of the housing 200, i.e., the expansion and deformation in the radial direction accompanying the compression of the buffer body 103 is limited, whereby the compression reaction force is secured. However, in this case, there is a concern of causing changes in characteristics in which the outer peripheral surface of the buffer body 103 is worn by repeatedly sliding with the inner peripheral surface 202a of the large-diameter cylindrical portion 202 of the housing 200, and therefore a transition point P between a linear region on the small displacement side and a nonlinear region on the large displacement side in the characteristic line illustrated in FIG. 6 moves to the large displacement side, so that the reaction force in the predetermined displacement amount decreases or the displacement amount in inputting a predetermined load in the axial direction increases.

The present invention has been made in view of the above-described points. It is a technical object of the present invention to provide a buffer stopper capable of increasing an absorbable energy amount without causing changes in characteristics.

Means for Solving the Problem

As a method for solving the technical problems described above, a buffer stopper according to the invention of Claim 1 has a buffer body containing a rubber elastic body disposed between an end surface formed in a housing and an end surface formed in a shaft which is relatively movable in the axial direction with respect to the housing, and a wear resistant sheet which is provided so as to surround the outer peripheral surface of the buffer body and which can contact the inner peripheral surface of the housing by expansion and deformation in the radial direction of the buffer body.

In a buffer stopper according to the invention of Claim 2, the wear resistant sheet contains cloth having elasticity in the configuration according to Claim 1.

Effect of the Invention

According to the buffer stopper of the present invention, the buffer body is prevented from expanding and deforming in the outer radial direction accompanying the compression in the axial direction by the wear resistant sheet, and therefore the compression reaction force increases, so that the absorbable energy amount can be increased and the wear of the outer peripheral surface of the buffer body due to the contact with the inner peripheral surface of the housing is prevented by the wear resistant sheet, and therefore a deterioration of the characteristics is prevented.

DETAILED DESCRIPTION OF PREFERRED EMBODIMENTS

Hereinafter, a preferable embodiment of a buffer stopper according to the present invention is described with reference to the drawings. First, FIG. 1 illustrates a first embodiment of the buffer stopper according to the present invention.

Figure 1:
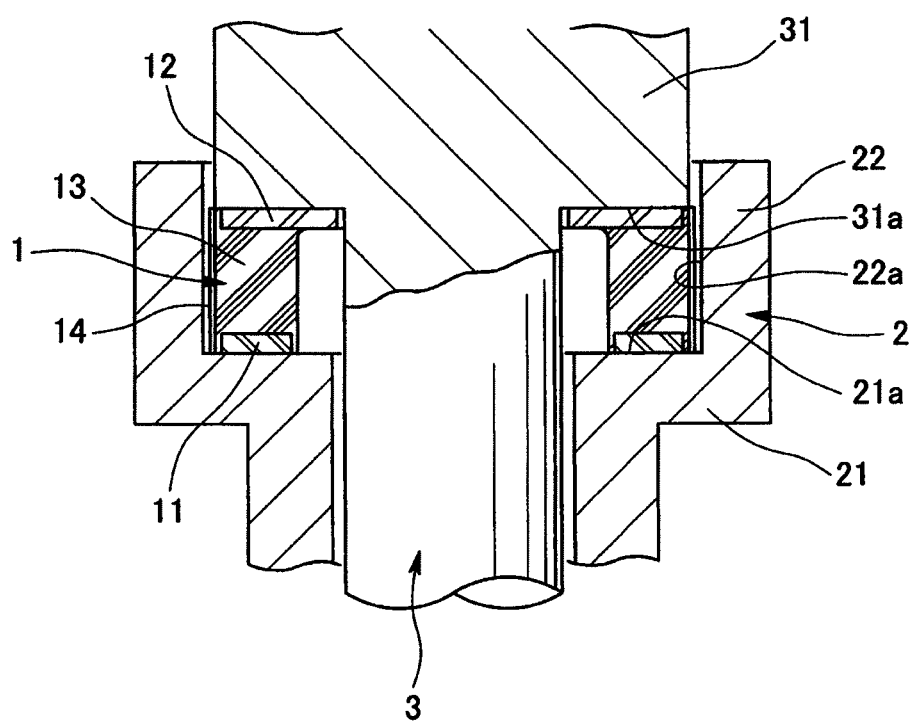
FIG. 1 is a cross-sectional view of a no load state illustrating a first embodiment of a buffer stopper according to the present invention.

In FIG. 1, the reference numeral 1 denotes a buffer stopper, 2 denotes a housing and is a rack housing in a steering gear of vehicles, for example, and 3 is a shaft passed through the housing 2 so as to be reciprocatable in the axial direction and is a steering rack in a steering gear of vehicles, for example. In an end portion of the shaft 3, an enlarged diameter portion 31 is formed. A flange portion 21 facing an end surface 31a of the enlarged diameter portion 31 in the axial direction, and a large-diameter cylindrical portion 22 which extends towards the side of the end portion of the shaft 3 from an outer diameter portion of the flange portion 21 and the inner diameter of which is larger than the diameter of the enlarged diameter portion 31 of the shaft 3 are formed.

The buffer stopper 1 is externally inserted into the shaft 3 and is disposed between an end surface 21a facing the enlarged diameter portion 31 side of the shaft 3 in the flange portion 21 of the housing 2 and the end surface 31a of the enlarged diameter portion 31 of the shaft 3. The buffer stopper 1 has a metal ring 11 caused to abut on the end surface 21a of the flange portion 21 of the housing 2, a metal ring 12 caused to abut on the end surface 31a of the enlarged diameter portion 31 of the shaft 3, a buffer body 13 integrally provided between the metal rings 11 and 12, and a wear resistant sheet 14 provided on the outer peripheral surface of the buffer body 13.

The metal rings 11 and 12 in the buffer stopper 1 are produced by punching a metal plate and are formed into a flat washer shape.

The buffer body 13 in the buffer stopper 1 is molded into an annular shape with a rubber elastic body (rubber material or synthetic resin material having rubber-like elasticity) and is integrally vulcanized and bonded between the metal rings 11 and 12.

The wear resistant sheet 14 in the buffer stopper 1 contains woven fabrics excellent in wear resistance, such as synthetic fibers. Those which are woven so as to have elasticity, such as knit or double knitting, are preferably adopted. The wear resistant sheet 14 is provided in an endless shape in the circumferential direction so as to surround the entire outer peripheral surface of the buffer body 13. The distance in the radial direction between an inner peripheral surface 22a of the large-diameter cylindrical portion 22 of the housing 2 and the outer peripheral surface of the buffer body 13 is smaller than the distance in the radial direction between the outer peripheral surface of the shaft 3 into which the buffer stopper 1 is externally inserted and the inner peripheral surface of the buffer body 13. Therefore, the wear resistant sheet 14 can contact the inner peripheral surface 22a of the large-diameter cylindrical portion 22 of the housing 2 by the expansion and deformation in the radial direction when the buffer body 13 receives the compression in the axial direction.

Figure 3:
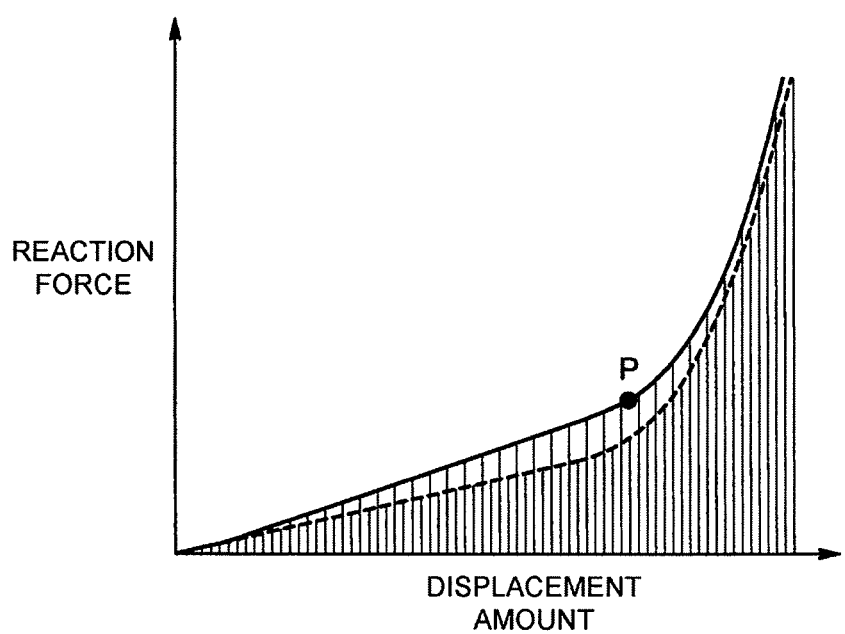
FIG. 3 is a characteristic diagram illustrating the characteristics of the buffer stopper according to the present invention as compared with the characteristics of a buffer stopper according to a conventional technique.

In the buffer stopper 1 configured as described above, when the shaft 3 relatively moves in the axial direction with respect to the housing 2 in a direction of compressing the buffer body 13, the buffer body 13 is compressed and deformed in the axial direction and expanded and deformed in the radial direction between the metal ring 11 caused to abut on the end surface 21a of the flange portion 21 of the housing 2 and the metal ring 12 caused to abut on the end surface 31a of the enlarged diameter portion 31 of the shaft 3. The wear resistant sheet 14 provided on the outer peripheral surface of the buffer body 13 contains woven fabrics having elasticity, and therefore permits the expansion and deformation in the outer radial direction of the buffer body 13. Therefore, a stress caused by the compression in the axial direction of the buffer body 13 is reduced by the expansion and deformation in the radial direction, i.e., the spring constant is kept low (The inclination of the characteristic line is small.) in the early stage of the compression with a small displacement amount as illustrated in FIG. 3, and therefore the shock between the housing 2 and the shaft 3 can be effectively absorbed.

Figure 2:
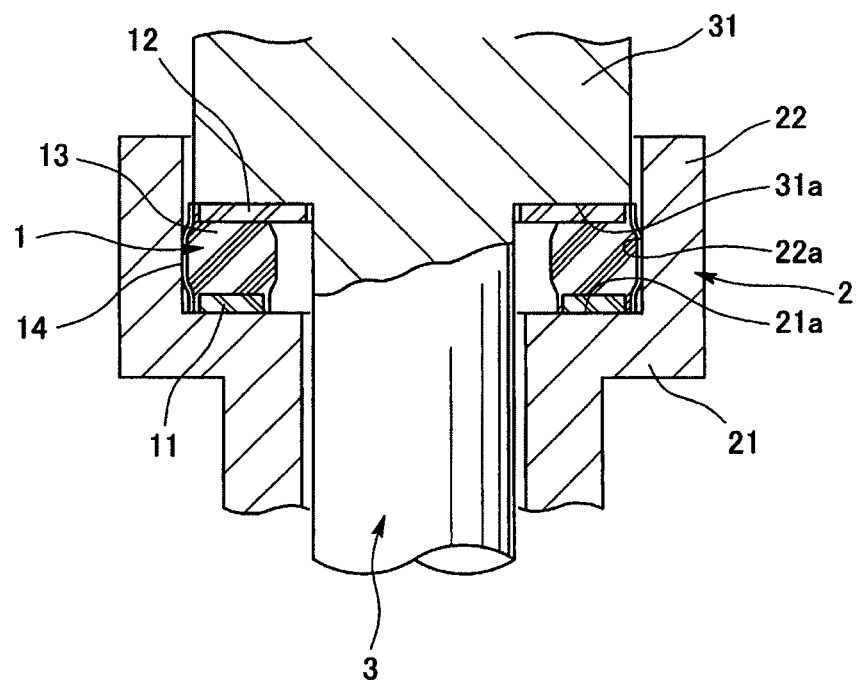
FIG. 2 is a cross-sectional view of a compression state of a buffer body illustrating the first embodiment of the buffer stopper according to the present invention.

Next, when the wear resistant sheet 14 provided on the outer peripheral surface of the buffer body 13 abuts on the inner peripheral surface 22a of the large-diameter cylindrical portion 22 of the housing 2 by the expansion and deformation in the radial direction of the buffer body 13 as illustrated in FIG. 2, the expansion and deformation in the radial direction of the buffer body 13 is suppressed. Therefore, a stress caused by the compression in the axial direction increases, and thus, when the compression and displacement amount increases to some extent, the spring constant nonlinearly increases (The inclination of the characteristic line increases.) as illustrated in FIG. 3, so that the relative displacement in the axial direction between the housing 2 and the shaft 3 can be effectively regulated.

Herein, although the wear resistant sheet 14 has elasticity as described above, the wear resistant sheet 14 has an action of suppressing the expansion and deformation in the radial direction of the buffer body 13 to some extent by being provided so as to surround the entire outer peripheral surface of the buffer body 13. Therefore, the spring constant in the early stage of the compression is somewhat higher (The inclination of the characteristic line is somewhat large.) than that of a conventional buffer stopper illustrated by the dashed line in FIG. 3, and the area of a hatched region between the characteristic line and the horizontal axis increases corresponding to the spring constant. Therefore, an action of increasing the energy amount absorbable by the buffer stopper 1 is achieved.

Moreover, the wear resistant sheet 14 can prevent the outer peripheral surface of the buffer body 13 from wearing due to contacting under pressure accompanying the sliding with the inner peripheral surface 22a of the large-diameter cylindrical portion 22 of the housing 2. Therefore, a transition point P between a linear region on the small displacement side and a nonlinear region on the large displacement side in the characteristic line illustrated in FIG. 3 is prevented from moving to the large displacement side due to the wear of the buffer body 13. Accordingly, a deterioration of the characteristics, such as a reaction force reduction in a predetermined displacement amount or a displacement amount increase when a predetermined load in the axial direction is input, does not occur.

Figure 4:
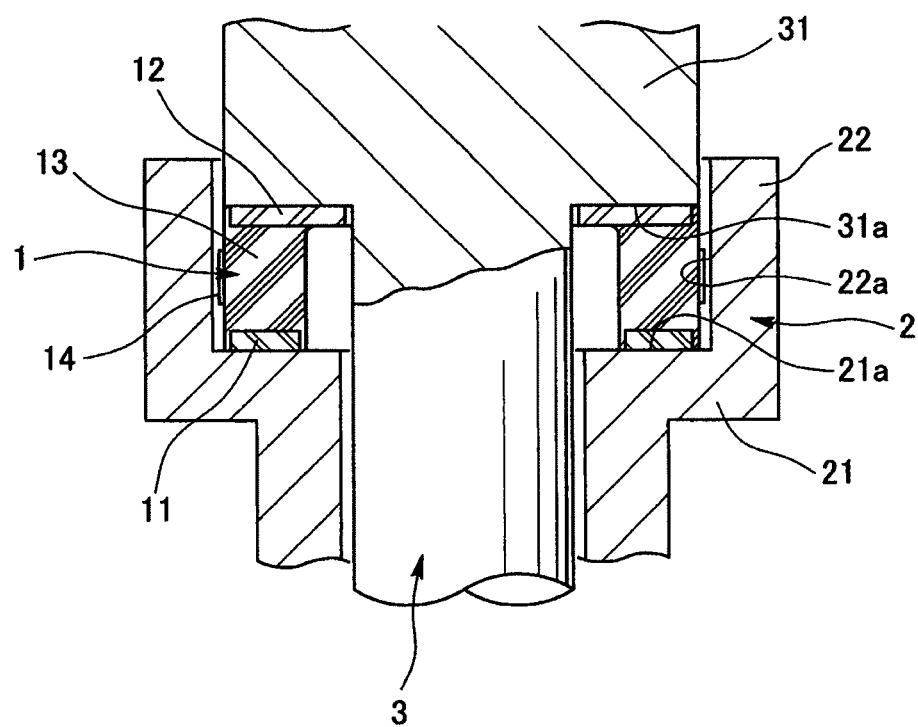
FIG. 4 is a cross-sectional view of a no load state illustrating a second embodiment of a buffer stopper according to the present invention.
Figure 5:
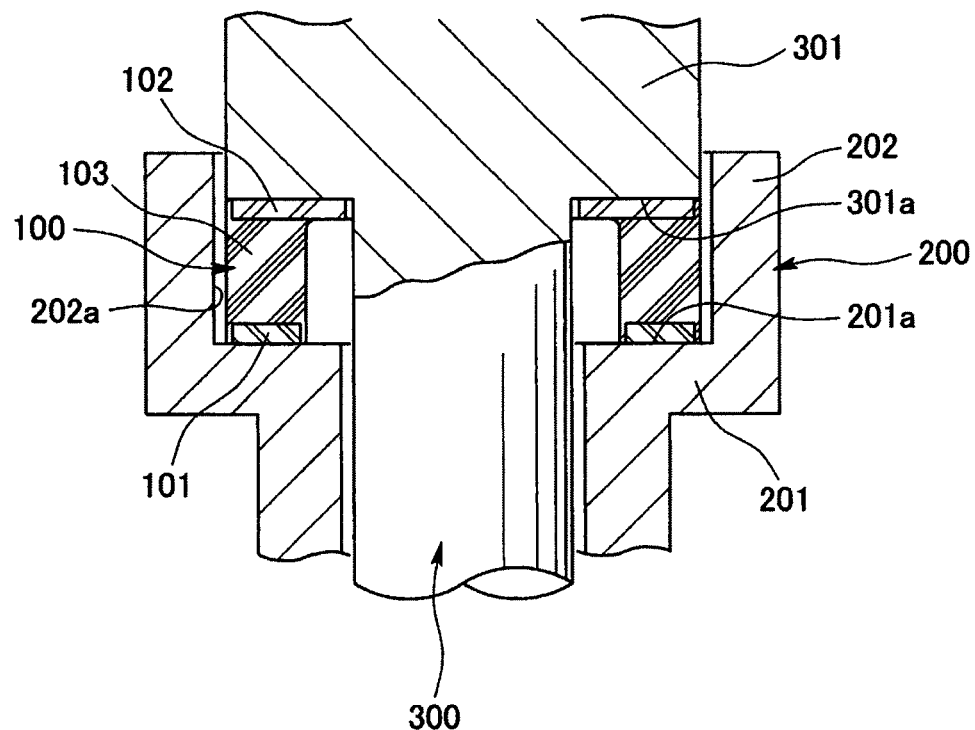
FIG. 5 is a cross-sectional view illustrating an example of the buffer stopper according to the conventional technique.
Figure 6:
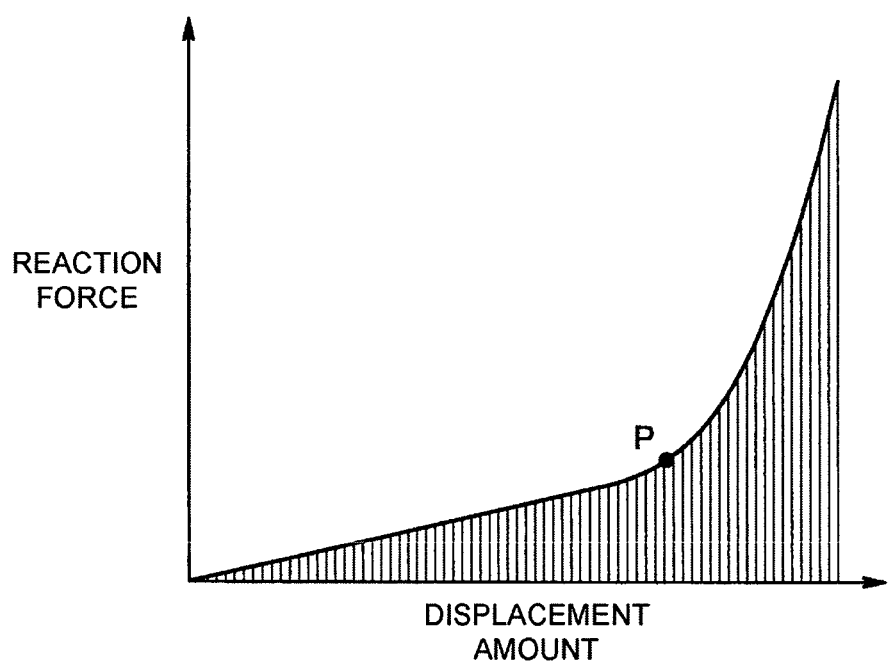
FIG. 6 is a characteristic diagram illustrating the characteristics of the buffer stopper according to the conventional technique.

In the above-described configuration, the wear resistant sheet 14 surrounds the entire outer peripheral surface of the buffer body 13. However, as illustrated in a second embodiment of the buffer stopper according to the present invention illustrated in FIG. 4, for example, the wear resistant sheet 14 may be provided only in an intermediate portion in the axial direction.

More specifically, the binding force of the wear resistant sheet 14 to the outer peripheral surface of the buffer body 13 decreases by being configured as described above, and therefore an increase in the absorbable energy amount is suppressed but, on the other hand, an increase in the spring constant in the early stage of the compression can be made small, i.e., the buffering properties in the early stage of the compression can be improved. Moreover, when the buffer body 13 has a certain amount of width in the axial direction, the wear of the buffer body 13 can be sufficiently prevented even when the wear resistant sheet 14 is provided only in the intermediate portion in the axial direction of the buffer body 13.

DESCRIPTION OF REFERENCE NUMERALS 1 buffer stopper
11, 12 metal ring
13 buffer body
14 wear resistant sheet
2 housing
21a end surface
22a inner peripheral surface
3 shaft
31a end surface

What is claimed is:

1. A buffer stopper comprising:
a buffer body containing a rubber elastic body disposed within a cylindrical recess formed in a housing, and between an end surface of the cylindrical recess formed in the housing and an end surface formed in a shaft which is relatively movable in an axial direction with respect to the housing, wherein the buffer body in an uncompressed state provides a uniform annular gap between an outer peripheral surface of the buffer body and an inner peripheral surface of the cylindrical recess throughout an entire axial length of the buffer body;
a wear resistant sheet which is provided so as to entirely surround an outer peripheral surface of the buffer body and which can contact an inner peripheral surface of the housing by expansion and deformation in a radial direction of the buffer body, wherein the wear resistant sheet is operable to suppress expansion and deformation of the buffer body in the radial direction; and
first and second metal rings,
wherein a portion of the body is arranged between the rings and the wear resistance sheet.

2. The buffer stopper according to claim 1, wherein the wear resistant sheet contains cloth having elasticity.

3. The buffer stopper according to claim 1,
wherein the first and second metal rings each have a flat washer shape,
wherein the first and second metal rings are parallel to each other, and
wherein the buffer body is bonded between the first and second metal rings.

4. A buffer stopper comprising:
a buffer body containing a rubber elastic body disposed within a cylindrical recess formed in a housing, and between an end surface of the cylindrical recess formed in the housing and an end surface formed in a shaft which is relatively movable in an axial direction with respect to the housing, wherein the buffer body in an uncompressed state provides a uniform annular gap between an outer peripheral surface of the buffer body and an inner peripheral surface of the cylindrical recess throughout an entire axial length of the buffer body;
a wear resistant sheet which is provided so as to entirely surround an outer peripheral surface of the buffer body and which can contact an inner peripheral surface of the housing by expansion and deformation in a radial direction of the buffer body, wherein the wear resistant sheet is operable to suppress expansion and deformation of the buffer body in the radial direction; and
first and second metal rings, wherein the first and second metal rings each have a flat washer shape,
wherein the first and second metal rings are parallel to each other,
wherein the buffer body is bonded between the first and second metal rings, and
wherein the first and second rings are in contact with the end surface of the cylindrical recess and the end surface of the shaft, respectively.

* * * * *